United States Patent [19]

Archibald et al.

[11] Patent Number: 4,642,498
[45] Date of Patent: Feb. 10, 1987

[54] INTERNAL COMMON NEUTRAL BUS IN LARGE THREE-PHASE GENERATOR

[75] Inventors: James B. Archibald; Frederick J. Rink, Jr., both of Schenectady, N.Y.

[73] Assignee: General Electric Company, Schenectady, N.Y.

[21] Appl. No.: 810,814

[22] Filed: Dec. 18, 1985

[51] Int. Cl.$^4$ ............................................. H02K 11/00
[52] U.S. Cl. .................................... 310/71; 310/68 R; 310/89; 310/91; 310/176; 310/184; 336/174; 336/175
[58] Field of Search ................... 310/68 R, 68 D, 176, 310/42, 71, 53, 89, 64, 91, 260, 180, 184; 339/19, 242, 228; 336/90, 174, 175, 67; 174/70 B, 71 B, 129 B, 149 B

[56] References Cited

U.S. PATENT DOCUMENTS

| | | | |
|---|---|---|---|
| 3,903,441 | 9/1975 | Towne | 310/71 |
| 4,029,978 | 6/1977 | Jager et al. | 310/71 |
| 4,172,984 | 10/1979 | Dagherty et al. | 310/71 |
| 4,254,352 | 3/1981 | Fidei et al. | 310/91 |
| 4,488,072 | 12/1984 | Archibald et al. | 310/71 |

FOREIGN PATENT DOCUMENTS 0664521 8/1938 Fed. Rep. of Germany ...... 336/174

OTHER PUBLICATIONS

General Electric Illustration for GENERREX TM Excitation System.
"Technical Overview through Development of the Largest Scale Turbine-Generator Model with Full Water Cooling", authors unknown, submitted to 1984 IEEE/PES winter meeting.

Primary Examiner—R. Skudy
Attorney, Agent, or Firm—Jerome C. Squillaro

[57] ABSTRACT

A common neutral bus is formed in a lower frame extension of a large three-phase generator by disposing three sets of neutral current transformers within the lower frame extension and interconnecting the three phases downstream of the neutral current transformers to form an internal neutral bus. The neutral bus is connected to an external neutral transformer through a neutral terminal of small size and low cost. Clamshell clamps are provided in the internal neutral bus for isolating the neutral ends of the generator winding for test purposes. Rigid support of the current transformers and a hollow copper tube passing therethrough permits use of light and low-cost hollow copper tubing in place of the relatively substantial and expensive neutral terminals conventionally required.

5 Claims, 5 Drawing Figures

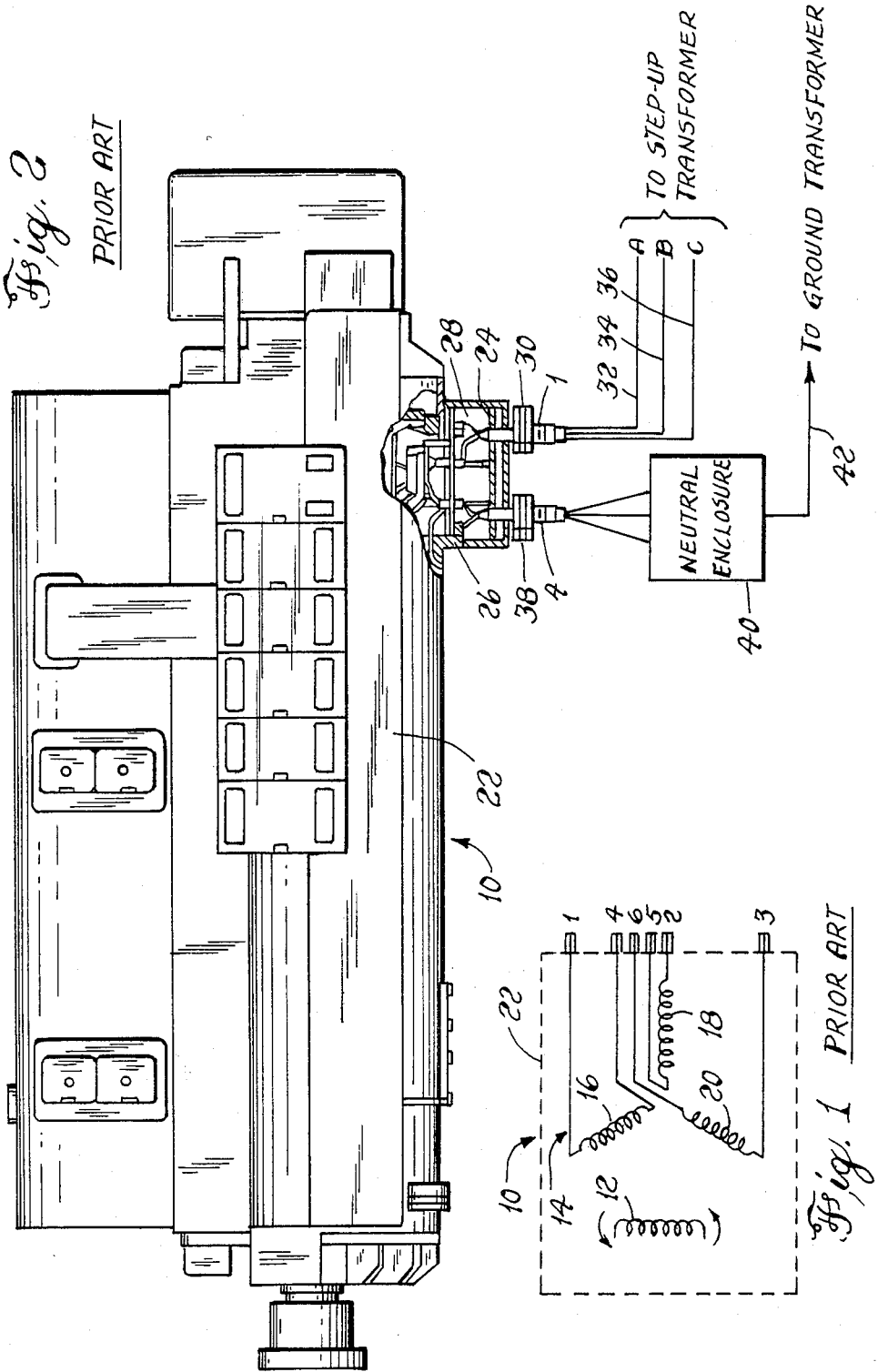

INTERNAL COMMON NEUTRAL BUS IN LARGE THREE-PHASE GENERATOR

BACKGROUND OF THE INVENTION

The present invention relates to generators and, more particularly, to apparatus for internally connecting the neutral ends of three stator windings of a large, three-phase generator.

Although the present invention may have applicability to other types of generators, for purposes of concreteness of description, the following disclosure is directed toward a two-pole, three-phase, generator.

A large three-phase generator conventionally includes a laminated stator having longitudinal slots into which conducting bars are installed. The ends of the conducting bars are interconnected by end turns to produce three stator windings whose centers are physically and electrically spaced about 120 degrees apart. Both ends of each winding are conventionally brought out of the generator stator frame to terminals for connection to external circuits.

External connection of the terminals may be arranged to produce either a wye-connected or a delta-connected generator. A wye connection is conveniently formed by placing a short-circuit jumper across the apropriate end of all of the windings. The shorted ends of the windings provides a neutral point at which the windings can be grounded. It is thus conventional practice to identify the three terminals which are to be jumpered together and grounded as the neutral terminals. The remaining three terminals are conventionally called the high-voltage terminals.

Certain test operations such as, for example, periodic high-voltage testing of individual windings, require that provision be made for isolating each phase by removing the jumper connecting the neutral ends of the three windings.

A substantial amount of space is required for mounting the three high-voltage terminals and the three neutral terminals, and for accommodating the internal connections thereto. If the six terminals are not spaced sufficiently apart, the electric fields generated by the current flowing in one terminal may interfere with the current measurements in an adjacent terminal. To satisfy the internal and external space requirements for connection and interference avoidance, it is conventional to provide a large lower frame extension extending below the envelope of the generator stator frame. The three high-voltage and three neutral terminals pass through bushings penetrating the bottom surface of the lower frame extension. Current transformers are disposed on the bushings external to the lower frame extension.

Due to the high currents passing through the high-voltage and neutral terminals, the bottom plate of the lower frame extension, through which the bushings pass, is conventionally made of stainless steel. Such a stainless steel plate is expensive.

The neutral terminals are shorted together in a neutral enclosure external to the generator stator frame. Such a neutral enclosure may be a stainless steel box as large as about four feet by four feet by eight feet. Both the neutral terminals and their associated enclosure are expensive and their elimination is desirable.

OBJECTS AND SUMMARY OF THE INVENTION

Accordingly, it is an object of the invention to provide a wye-connected generator in which external neutral terminals are not required.

It is a further object of the invention to provide a generator in which neutral current monitoring is performed by current transformers disposed within a lower frame extension.

It is a still further object of the invention to provide a three-phase, wye-connected generator having an internal ground point to which the ground connections from at least two of the generator windings may be disconnected for isolating the individual windings.

It is a still further object of the invention to provide an internal ground for a three-phase, wye-connected generator including current transformers internal to a lower frame extension, wherein the current transformers are cooled by the internal cooling medium.

It is a still further object of the invention to provide apparatus located within a lower frame extension of a generator for measuring neutral current which avoids the need for neutral bushings.

It is a still further object of the invention to provide internal support for neutral current transformers effective for reducing vibration of the neutral current transformers.

Briefly stated, the present invention provides a common neutral bus formed in a lower frame extension of a large three-phase generator by disposing three sets of neutral current transformers within the lower frame extension, and interconnecting the three phases downstream of the neutral current transformers to form an internal neutral bus. The neutral bus is connected to an external neutral transformer through a small neutral terminal. Clamshell clamps are provided in the internal neutral bus for isolating the neutral ends of the generator winding for testing purposes.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a simplified schematic diagram of a three-phase generator.

FIG. 2 is a side view of a three-phase generator of the prior art, with portions partly cut away to reveal internal elements of interest to the description.

DETAILED DESCRIPTION OF THE PREFERRED EMBODIMENT

Figure 3:
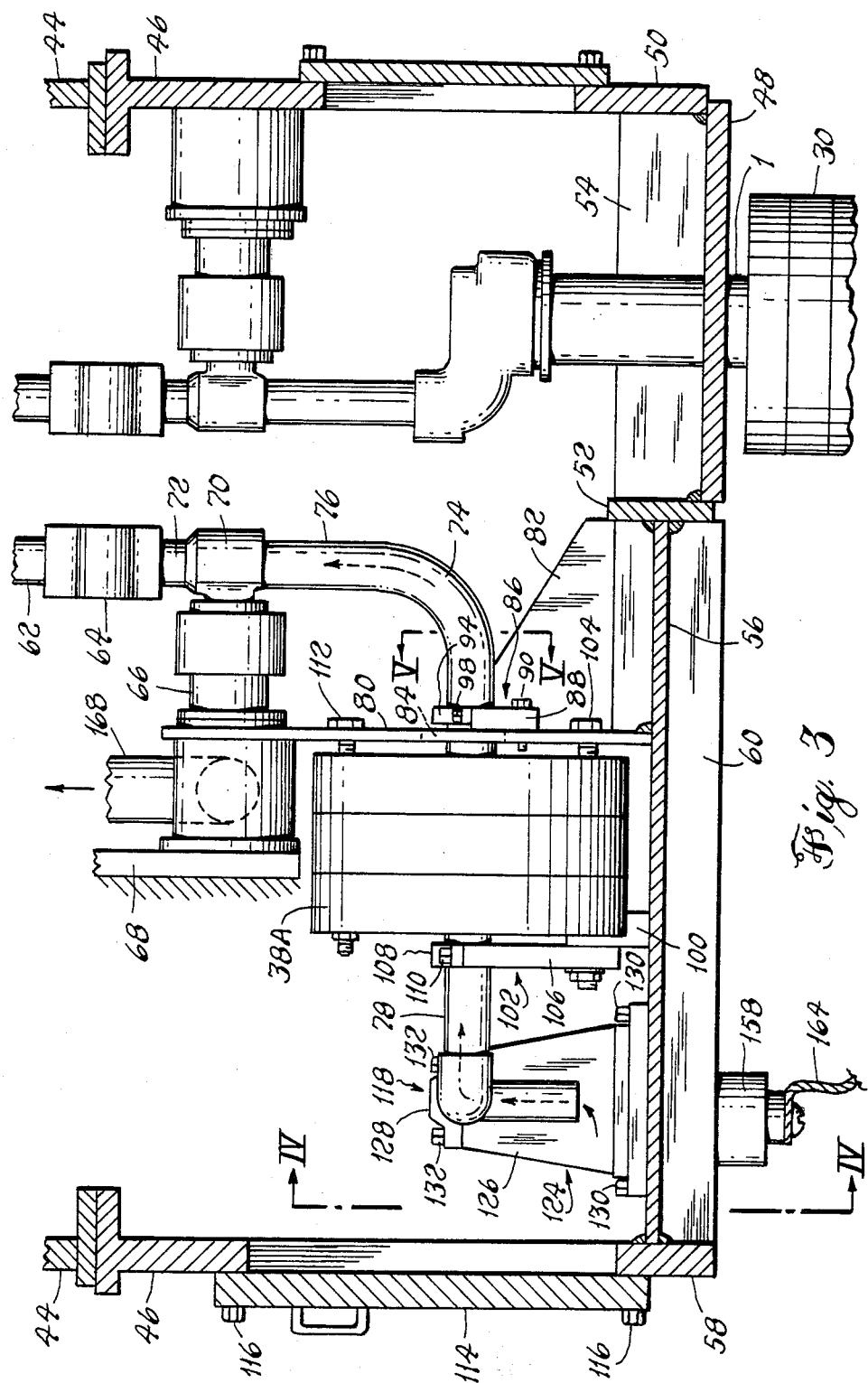
FIG. 3 is a side cross-sectional view of a portion of a three-phase generator according to an embodiment of the invention.

Referring to FIG. 1, there is shown, generally at 10, a three-phase generator including a stator and a rotor (not shown) to which reference will be made in describing the prior art. A field winding 12, which is a part of a generator and is energized by a source of direct current (not shown), rotates within an armature 14 located in a stator portion of the generator containing a set of three armature windings 16, 18 and 20. The rotating flux field produced by field winding 12 induces an alternating current in each of armature windings 16, 18 and 20. The foregoing elements are contained in a stator frame 22 (indicated by a dashed line).

The two ends of armature winding 16 are brought out of stator frame 22 on terminals 1 and 4. Similarly, the two ends of armature winding 18 are brought out on terminals 2 and 5; and the two ends of armature winding 20 are brought out on terminals 3 and 6. Wye connection of three-phase generator 10 is accomplished by connecting an external jumper (not shown) between terminals 4, 5 and 6 which are thus called neutral terminals. Terminals 1, 2 and 3 are called high-voltage terminals.

Referring now to FIG. 2, a side view of three-phase generator 10 shows a lower frame extension 24 sealedly affixed to stator frame 22 at a bolted flange 26. An interior 28 of lower frame extension 24 provides space for making electrical and cooling connections from armature 14 (FIG. 1) to terminals 1 through 6 (terminals 2 and 3 are hidden behind terminal 1, and terminals 5 and 6 are hidden behind terminal 4). One or more iron core current transformers 30 are disposed about terminal 1, and similar iron core current transformers 30 (hidden) are disposed about terminals 2 and 3, for fault detection and for metering current fed to a step-up transformer (not shown) on lines 32, 34 and 36. One or more iron core current transformers 38 are disposed about terminals 4, 5 and 6 (terminals 5 and 6 are hidden) for monitoring current therein.

Terminals 4, 5 and 6 are jumpered together within a neutral enclosure 40 and connected to the bottom of lower frame extension 24 to configure three-phase generator 10 as a wye-connected generator. A ground lead 42 is connected to ground through a conventional ground transformer (not shown). In this configuration, iron core current transformers 30 monitor high-voltage current in each of terminals 1, 2 and 3, and iron core current transformers 38 monitor ground current in each of terminals 4, 5 and 6. The high-voltage and neutral currents from each winding of armature 14 (FIG. 1) are substantially equal in the absence of a fault in armature 14. In the absence of an internal or external fault, the current on ground lead 42 is very low. Thus, ground lead 42 is not normally required to carry a high current.

Terminals 1-6 must be spaced sufficiently apart to accomodate Iron Core Transformers 30. Lower frame extension 24 permits such spacing. In addition, lower frame extension 24 provides sufficient internal space for making the electrical and cooling connections to the six terminals. The internal electrical and cooling connections in three-phase generator 10 are conventional and may be more fully studied by reference to U.S. Pat. No. 4,488,072, the disclosure of which is herein incorporated by reference. Further description of such internal electrical and cooling connections is therefore deemed unnecessary, and is omitted herefrom.

We have discovered that sufficient space is available within lower frame extension 24 for iron core current transformers 38. This affords the opportunity for creating an internal neutral bus, thus eliminating the need for neutral enclosure 40. With proper internal support of iron core current transformers 38, the expense of terminals 4, 5 and 6 can be eliminated.

Referring now to FIG. 3, a close-up view of a portion of a three-phase generator 44, according to an embodiment of the invention, is shown. A lower frame extension 46 includes a first bottom panel 48 disposed in the vicinity of terminals 1, 2 and 3 (terminals 2 and 3 are hidden behind terminal 1) in order to accommodate the high currents encountered in this region.

First bottom panel 48 is preferably made of stainless steel 48 welded at a first edge to a side wall 50 of lower frame extension 46 and at a second edge to a transverse web 52. A plurality of reinforcing webs 54 are disposed across stainless steel bottom panel 48 between side wall 50 and transverse web 52.

A second bottom panel 56 is disposed between transverse web 52 and a second side panel 58 of lower frame extension 46. Second bottom panel 56 is preferably welded in place along all four of its edges. A plurality of reinforcing webs 60 are welded in place across the exterior of second bottom panel 56 extending from transverse web 52 to side panel 58. Since second bottom panel 56 is not penetrated by bushings carrying high currents, the expense of stainless steel is not required in this location. Thus, a substantial cost savings may be achieved by substituting a carbon steel to reduce thereby the amount of stainless steel in lower frame extension 46.

The internal and external connections and cooling for terminals 1, 2 and 3 are conventional and more details may be obtained by reading the referenced patent. Thus, a further description of elements related to terminals 1, 2 and 3 is omitted herefrom.

Figure 4:
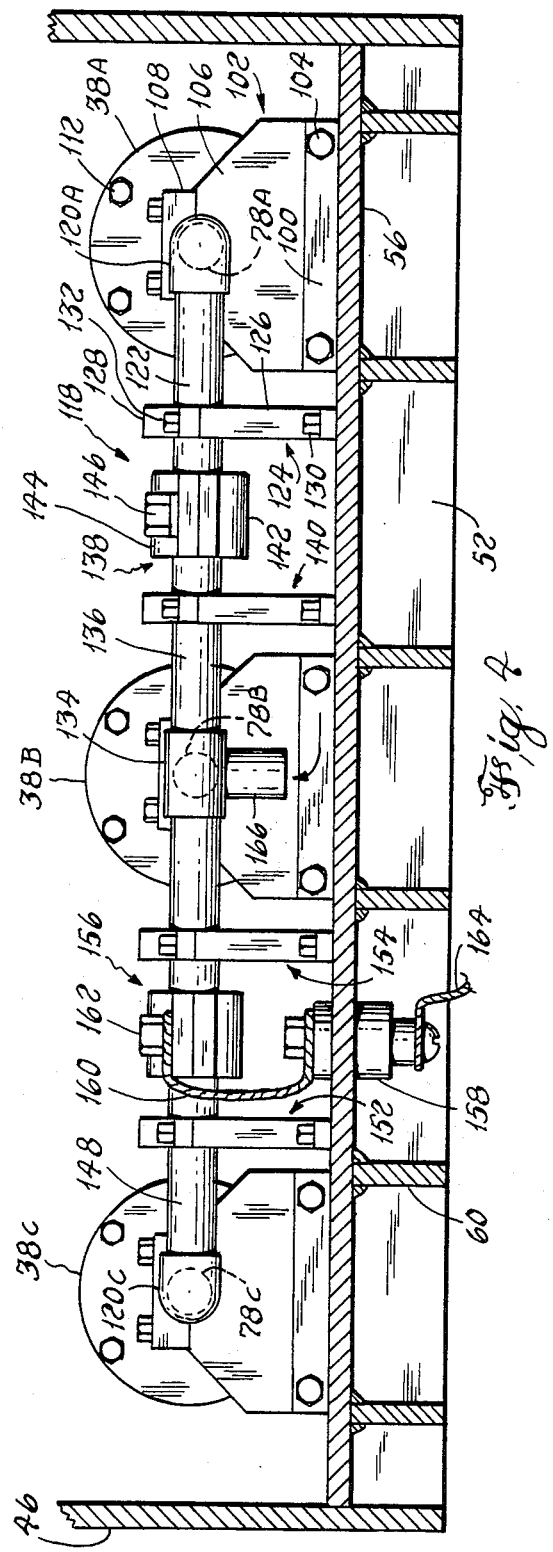
FIG. 4 is a cross section taken along IV—IV of FIG. 3.

Referring now also to FIG. 4, iron core current transformers 38A, B and C are mounted on second bottom panel 56 with their axes disposed in the horizontal direction. In the side view of FIG. 3, only the elements associated with iron core current transformer 38A are shown. It will be understood that corresponding elements are provided for iron core current transformers 38B and 38C but such corresponding elements are hidden in this view. A connection bar 62, from one of the neutral connection rings (not shown), is connected to one end of a flexible connection strap 64 which may be, for example, a domed connection strap of the type disclosed in the referenced patent. A standoff insulator 66 is rigidly affixed at one end to a stationary structure 68 which is rigidly affixed to lower frame extension 46. A Tee fitting 70 is rigidly affixed to the second end of standoff insulator 66 and thereby is held rigidly stationary. A connection stub 72 is connected between a first arm of Tee fitting 70 and flexible connection strap 64. A hollow copper tube 74 includes a vertical portion 76 whose end is sealedly connected to a second arm of Tee fitting 70, and a horizontal portion 78 which passes axially through iron core current transformer 38A.

Figure 5:
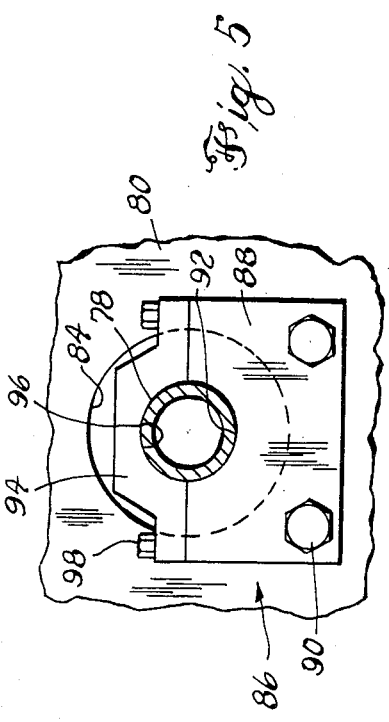
FIG. 5 is a cross section taken along V—V of FIG. 3.

Referring momentarily to FIG. 5, horizontal portion 78 passes axially through a clearance hole 84 in support plate 80 which is, in turn, aligned with the axis of iron core current transformer 38A. A rear insulating clamp 86 rigidly affixes horizontal portion 78 to support plate 80. Rear insulating clamp 86 includes a lower half 88 rigidly affixed to support plate 80 by, for example, bolts 90. A semi-cylindrical depression 92 in the upper surface of lower half 88 embraces the lower half of the perimeter of horizontal portion 78. An upper half 94 of rear insulating clamp 86 includes a mating semi-cylindrical depression 96 embracing the upper half of the perimeter of horizontal portion 78. Upper half 94 and lower half 88 are tightly clamped together using, for example, clamping bolts 98. Rear insulating clamp 86 may be made of any convenient insulating material having the requisite strength and resistance to the chemical and thermal environment within lower frame extension 46. Rear insulating clamp 86 is preferably made of a fiber-reinforced resin and, most preferably, of an epoxy resin reinforced with glass fibers.

Returning now to FIG. 3, a support plate 80 at one end of iron core current transformer 38A is affixed to second bottom panel 56 at its bottom end and is rigidly affixed to standoff insulator 66 at its upper end. A plurality of reinforcing gussets 82 (only one of which is shown) are welded at their perimeters to transverse web 52; second bottom panel 56 and support plate 80 thereby stiffening and reinforcing support plate 80. A front support block 100 supports the bottom of the front end of iron core current transformer 38A. A front insulating clamp 102 is affixed to front support block 100 by a plurality of bolts 104 (only one of which is shown) which pass through aligned holes in front insulating clamp 102, front support block 100, iron core current transformer 38A and support plate 80 for rigidly clamping these elements together.

Front insulating clamp 102 includes a lower half 106 and an upper half 108 which are clamped by bolts 110 about the forward end of horizontal portion 78 just after it passes from iron core current transformer 38A. A plurality of bolts 112 pass through support plate 80 and iron core current transformer 38A for rigidly stabilizing upper portions of iron core current transformer 38A.

Horizontal portion 78 is securely and rigidly affixed to the structure of lower frame extension 46 by substantial supports close to its entry and exit to iron core current transformer 38A, and iron core current transformer 38A is similarly rigidly affixed. The conventional terminals, which may cost several thousand dollars, may thus be eliminated.

An access door 114, sealedly affixed to side panel 58 by a plurality of bolts 116, provides access to iron core current transformers 38A, 38B, 38C and related components within lower frame extension 46.

Referring again to FIG. 4, a common neutral bus 118 interconnects horizontal portion 78 of hollow copper tubes 74 passing through iron core current transformers 38A, 38B and 38C. An elbow 120A connects horizontal portion 78A to a neutral bus stub tube 122. An outboard end of neutral bus stub tube 122 is supported by an insulating standoff 124 consisting of a lower half 126 and an upper half 128 embracing and securely holding neutral bus stub tube 122 in fixed positional relationship to bottom panel 56. A pair of bolts 130 secure lower half 126 to second bottom 56 and a pair of bolts 132 clamp upper half 128 and lower half 126 together for secure retention of neutral bus stub tube 122 therein.

In one embodiment of the invention, a bedding layer (not shown) of an uncured, resin-impregnated fiber is disposed about neutral bus stub tube 122 before it is captured between upper half 128 and lower half 126. When cured, the bedding layer fits tightly between neutral bus stub tube 122 and insulating standoff 124, whereby motion and vibration of neutral bus stub tube 122 is prevented. In addition, bolts 132 may be replaced by a suitable fiber roving. Each of the other insulated clamping devices including rear insulating clamp 86 (FIG. 3) and front insulating clamp 102 may be similarly treated.

The hollow copper tubes passing through iron core current transformers 38B and 38C are supported by apparatus identical to that described in connection with iron core current transformer 38A. Description of such additional support apparatus would be redundant and is therefore omitted.

A double Tee 134, connected to the hollow copper tube (not shown) passing through iron core current transformer 38B, supports a first neutral bus stub tube 136 directed toward, and collinear with, neutral bus stub tube 122. A clamshell clamp 138 provides mechanical and electrical connection between adjacent ends of neutral bus stub tubes 122 and 136. An insulating standoff 140 supports the free end of neutral bus stub tube 136. Clamshell clamp 138 includes a lower half 142 and an upper half 144 secured together about neutral bus stub tubes 122 and 136 by clamping bolts 146. Clamshell clamp 138 is removable for isolated testing of the two related windings of the generator as may periodically be required. When clamshell clamp 138 is thus removed, insulating standoffs 124 and 140 continue to stabilize the free ends of neutral bus stub tubes 122 and 136.

An elbow 120C, affixed to the end of horizontal portion 78C of hollow copper tube 74 passing through iron core current transformer 38C, supports one end of a neutral bus stub tube 148. A second neutral bus stub tube 150 is affixed in a second arm of double Tee 134 directed toward, and collinear with, neutral bus stub tube 148. The free ends of neutral bus stub tubes 148 and 150 are supported by insulating standoffs 152 and 154, respectively. A clamshell clamp 156 provides mechanical and electrical connection between free ends of neutral bus stub tubes 148 and 150. Clamshell clamp 156 is removable for isolation of its respective generator windings (FIG. 1).

A neutral bushing or terminal 158 passes sealedly through second bottom panel 56. A conductor 160 provides electrical connection between common neutral bus 118 and neutral bushing or terminal 158. Conductor 160 may be connected to common neutral bus 118 in any convenient manner such as, for example, clamping under a bolt 162 of clamshell clamp 156. A ground lead 164 is connected from the exterior of neutral bushing or terminal 158 to a conventional ground transformer (not shown). Since the net current and voltage in ground lead 164 are very small under normal operation, neutral bushing 158 may be correspondingly small and of consequent low cost compared to the neutral bushing conventionally used.

A coolant inlet tube 166 extends downward from double Tee 134 toward second bottom panel 56 for admitting a flow of coolant gas to common neutral bus 118. As best seen in the coolant flow dashed lines in FIG. 3, the gaseous coolant flows along common neutral bus 118, through hollow copper tube 74 and standoff insulator 66 and is drawn through a coolant exhaust tube 168 by a lower pressure existing in another region of the generator connected thereto. The type of cooling, the cooling medium used and the particular flow path employed are not considered to be inventive parts of the present disclosure, and their replacement with cooling arrangements different from those described herein does not render an equipment containing such replacement cooling outside the scope of the present invention.

In a further embodiment of the invention (not illustrated), only iron core current transformers 38A, B and C are affixed to bottom panel 56 using elements corresponding to front support block 100, support plate 80, bolt 104 and bolt 112. In this embodiment, each hollow copper tube 74 relies for support on its own strength and on its iron core current transformer.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What we claim is:

1. A three-phase generator including a stator rotatably disposed within said stator comprising:
    a stator frame containing said stator;
    a rotor rotatably disposed within said stator;
    at least first, second and third windings in said stator;
    each of said first, second and third windings including a first and a second end;
    a frame extension in said stator frame;
    means for connecting said first ends of said first, second and third windings to first, second and third high-voltage terminals in said bottom panel;
    at least first, second and third neutral current transformers each having an axis;
    means for rigidly affixing said first, second and third neutral current transformers to said frame extension within said stator frame with said axes of said first, second and third neutral current transformers disposed in a horizontal direction;
    means for passing current from said second ends of said first, second and third windings through said first, second and third current transformers, respectively;
    a common neutral bus downstream of said first, second and third current transformers;
    said common neutral bus including means for electrically interconnecting said first, second ends;
    means in said common neutral bus for disconnecting said second ends of said first, second and third windings from each other;
    a neutral terminal in said frame extension; and conductor means for electrically connecting said common neutral bus to said neutral terminal.

2. A three-phase generator according to claim 1 wherein said frame extension includes a first bottom panel covering less than all of the area of said bottom panel and a second bottom panel covering the remaining area of said bottom panel, said first and second bottom panels being of different materials.

3. A three-phase generator according to claim 1 wherein said means for rigidly affixing includes at least one support block affixed to said frame extension, and said at least one support block includes means for rigidly supporting said first, second and third neutral current transformers.

4. A three-phase generator according to claim 1 wherein said common neutral bus includes:
    a first neutral bus stub tube connected to said second end of said first winding downstream of said first current transformer;
    a second and a third neutral bus stub tube connected to said second end of said second winding downstream of said second current transformer;
    a fourth neutral bus stub tube connected to said second end of said third winding downstream of said third current transformer;
    said first, second, third and fourth neutral bus stub tubes being collinear;
    said first and second neutral bus stub tubes being disposed facing each other;
    a first removable clamp electrically connecting said first and second neutral bus stub tubes;
    said third and fourth neutral bus stub tubes being disposed facing each other;
    a second removable clamp electrically connecting said third and fourth neutral bus stub tubes whereby said second ends of said first, second and third windings are electrically connected together; and
    said first and second removable clamps, when removed, being said disconnecting means.

5. A three-phase generator according to claim 4, wherein said common neutral bus further includes means for supporting free ends of said first, second, third and fourth neutral bus stub tubes upon said frame extension.

* * * * *